(12) United States Patent
Hinshaw et al.

(10) Patent No.: US 7,139,783 B2
(45) Date of Patent: Nov. 21, 2006

(54) MATERIALIZED VIEW SYSTEM AND METHOD

(75) Inventors: Foster D. Hinshaw, Somverville, MA (US); Aaron C. Beals, Westford, MA (US)

(73) Assignee: Netezza Corporation, Framingham, MA (US)

( * ) Notice: Subject to any disclaimer, the term of this patent is extended or adjusted under 35 U.S.C. 154(b) by 79 days.

(21) Appl. No.: 10/775,766

(22) Filed: Feb. 10, 2004

(65) Prior Publication Data

US 2004/0225666 A1 Nov. 11, 2004

Related U.S. Application Data

(60) Provisional application No. 60/446,366, filed on Feb. 10, 2003.

(51) Int. Cl.
*G06F 17/30* (2006.01)
*G06F 7/00* (2006.01)

(52) U.S. Cl. .......................................... 707/205; 707/2

(58) Field of Classification Search ................ 707/200, 707/100, 4, 204, 3, 205
See application file for complete search history.

(56) References Cited

U.S. PATENT DOCUMENTS

| | | | | |
|---|---|---|---|---|
| 5,842,207 A | * | 11/1998 | Fujiwara et al. ................ | 707/7 |
| 6,308,284 B1 | * | 10/2001 | LeCrone et al. ................ | 714/6 |
| 6,745,207 B1 | * | 6/2004 | Reuter et al. ................ | 707/200 |
| 2002/0040413 A1 | * | 4/2002 | Okada et al. .................. | 710/68 |
| 2003/0126143 A1 | * | 7/2003 | Roussopoulos et al. ..... | 707/100 |
| 2004/0128289 A1 | * | 7/2004 | Cochrane et al. .............. | 707/4 |

OTHER PUBLICATIONS

Oracle9iAS Clickstream Intelligence Administrator's Guide, Release 2 (9.0.2), May 2002, Oracle®.*
Storage Networking Virtualization, What's it all about? Dec. 2000, IBM.*
Oracle8i™ for Data Warehousing, Features Overview, Feb. 1999, Oracle®.*
Hutchinson, D.A., "Parallel Algorithms in External Memory," Ph.D. thesis, Carleton University, Ottawa, Canada, ©1999, 2000, David Alexander Hutchinson, abstract (http://www.cs.duke.edu/~hutchins/abstract_thesis.html) and notes (6 pp.).
Gupta, A. and I.S. Mumich, "Maintenance of Materialized Views: Problems, Techniques, and Applications," *Bulletin of the Technical. Committee on Data Engineering*, 18(2)m IEEE Computer Society, 3-18 (1995).
Roussopoulos, N. et al., "The ADMS Project: Views "Я" Us," *Bulletin of the Technical. Committee on Data Engineering*, 18(2), IEEE Computer Society, 19-28 (1995).
Zhou, G. et al., "Data Integration and Warehousing Using H20," *Bulletin of the Technical. Committee on Data Engineering*, 18(2), IEEE Computer Society, 29-39 (1995).
Hammer, J. et al., "The Stanford Data Warehousing Project," *Bulletin of the Technical. Committee on Data Engineering*, 18(2), IEEE Computer Society, 40-47 (1995).

(Continued)

*Primary Examiner*—John R. Cottingham
*Assistant Examiner*—Kuen S. Lu
(74) *Attorney, Agent, or Firm*—Hamilton, Brook, Smith & Reynolds, P.C.

(57) ABSTRACT

Described herein is a system for creating and maintaining materialized views. The maintenance of the materialized views is performed in a distributed manner that improves efficiency and performance in response to the queries for materialized views or views on top of the materialized views.

53 Claims, 7 Drawing Sheets

OTHER PUBLICATIONS

Yang, J., et al., "Algorithms for Materialized View Design in Data Warehousing Environment," *VLDB '97, Proceedings of 23rd International Conference on Very Large Databases*, Aug. 25-29, 1997, Athens, Greece (pp. 136-145 [1-26]).

Blakeley, J.A., et al., "Efficiently Updating Materialized Views," *ACM SIGMOD Record 15(2)*:61-71 (Jun. 1986).

Abiteboul, S, et al., Incremental Maintenance for Materialized Views over Semistructured Data, *VLDB '98, Proceedings of 24th International Conference on Very Large Databases,* Aug. 24-27, 1998, New York, NY (pp. 38-49) [1-24]).

"Data Warehousing and Very Large Databases (VLDB)," Getting to Know ORACLE8/, 2-22—2-26.

Stanchev, OL., "Semantic Data Control in Distributed Database Environment," Survey Paper for CS748T Distributed Database Management, University of Waterloo, 1-25 (2001).

"Survey for Update Propagation in Piazza," http://www.cs.washington.edu/homes/lunadong/courses/544Project_survey.pdf , downloaded Jan. 12, 2005 (4 pp.).

Robert Ramey Software Development, "The Postman's Sort," originally appeared in C User's Journal, 1992 [retrieved Feb. 28, 2003], Retrieved from the Internet <URL: http://www.rrsd.com/psort/cuj/cuj.htm>.

"The ACID Model," [online] [retrieved Feb. 28, 2003], Retrieved from the Internet <URL: http://databases.about.com/library/weekly/aa120102a.htm>.

\* cited by examiner

MATERIALIZED VIEW SYSTEM AND METHOD

RELATED APPLICATION

This application claims the benefit of U.S. Provisional Application No. 60/446,366, filed Feb. 10, 2003. The entire teachings of the above application are incorporated herein by reference.

BACKGROUND OF THE INVENTION

In modern databases, views are computed and stored to allow efficient querying and analysis of the data. A view provides an alternate method for accessing data contained in a database's base table. Usually, a view is a child of and exists as a filter on top of the base table(s), and does not itself contain data. Generally, the query used to generate the view condenses, combines, or otherwise processes the data residing in one or more underlying base tables.

A materialized view is similar to a view in syntax and output; however, materialized views contain their own distinct data. In order to be materialized, such a view must exist physically in storage. Materialized views provide faster data access than do base tables with non-materialized views.

Materialized view architectures historically have to deal with issues of creation, storage, and maintenance. Keeping materialized views up to date may be an expensive process, with the expense defined in terms of storage space, response time, and computational resources needed to maintain the materialized view. However, if a materialized view is not kept up to date, the data contained it is considered stale or invalid, and the view cannot be used until the maintenance is performed.

Materialized views are typically created and stored in the same location as the base relations they are built from, kept on mass storage devices. On data retrieval, the materialized view records are read from disk and returned to the database.

SUMMARY OF THE INVENTION

Described herein is a system for creating and maintaining materialized views.

There have been several attempts to solve the problem of materialized view maintenance. The simplest and most expensive solution is to rebuild the entire view as changes to the base relation are performed. Another solution involves actual modification and re-writing of the existing records in storage. This rewriting can become tedious and time-consuming if records also need to be sorted in a particular order. Other solutions have been proposed for maintenance, such as, for example, keeping a modification log.

There are two phases to the maintenance of materialized views; the first phase is a "modification" phase, during which the changes are entered. The second phase is a "refresh" phase, during which the changes are actually physically propagated to the materialized view. The "modification" phase is limited to a single write to the base relation; each insert or update operation writes to the base relation as well as the materialized view, whether directly in storage or in a log. Furthermore, the per-storage-unit autonomous processing is leveraged to expedite the "refresh" phase with minimal system impact, keeping the materialized views usable (not stale) all the while. The maintenance of the materialized views is performed in a distributed manner that improves efficiency and performance in response to the queries for materialized views or views on top of the materialized views. Rather than one processing unit, such as a host, needing to do all the maintenance on materialized views, the individual storage units may perform the maintenance on their individual portion of the materialized view.

The maintenance of the portions of the materialized view may be assisted by a set of instructions associated with the materialized view. These instructions can be used in the creation of the materialized view; that is, converting base relation records into materialized view records. The set of instructions may then also be used to propagate the new records into the materialized view. Other instructions may exist for purposes of modifying records or deleting records. Regardless of instruction type, the instructions may be compiled at the host and executed on the storage units or they may be individually interpreted on each storage unit. Alternatively, the instructions for maintaining the materialized view may be automatically generated based on a data schema. Instructions that are sent from the host controller to the storage units may be cached on the storage units for future use.

When new records are added to the base table, they need not be immediately inserted into the materialized view. Instead, they may be stored on disk without insertion into the materialized view. The new records may be tagged as private or public. The stored new records may be transformed into a format appropriate for the materialized view before being stored on disk. Alternatively, the new data may be transformed into the appropriate format only when it is needed in response to a query.

The new records may be merged with the records from the materialized view as they streamed to output in response to a query. The transformation and/or merging may be performed in the storage unit hardware. The new records may physically be merged into the materialized view during a time of low activity on the storage unit.

Similarly, deleted data may not be deleted immediately and, instead, an indication of deleted data may be stored on disk. The indication may be by record ID, transaction ID, or other criteria, such as, for example, by time of the transaction. The deleted records may then be removed from data from the materialized view as it is streamed to output in response to a query.

The materialized view may be compressed to conserve space or time it takes to scan the materialized view. The compression may be an arithmetic compression, where records are compressed before being stored on disk and are uncompressed after a read operation. In an alternative embodiment of the invention, the materialized view may be compressed by removing particular headers. In yet another aspect of the embodiment, compression may be accomplished by assigning a smaller data type to a column of a larger data type if all data within it is capable of being fit into the smaller data type.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
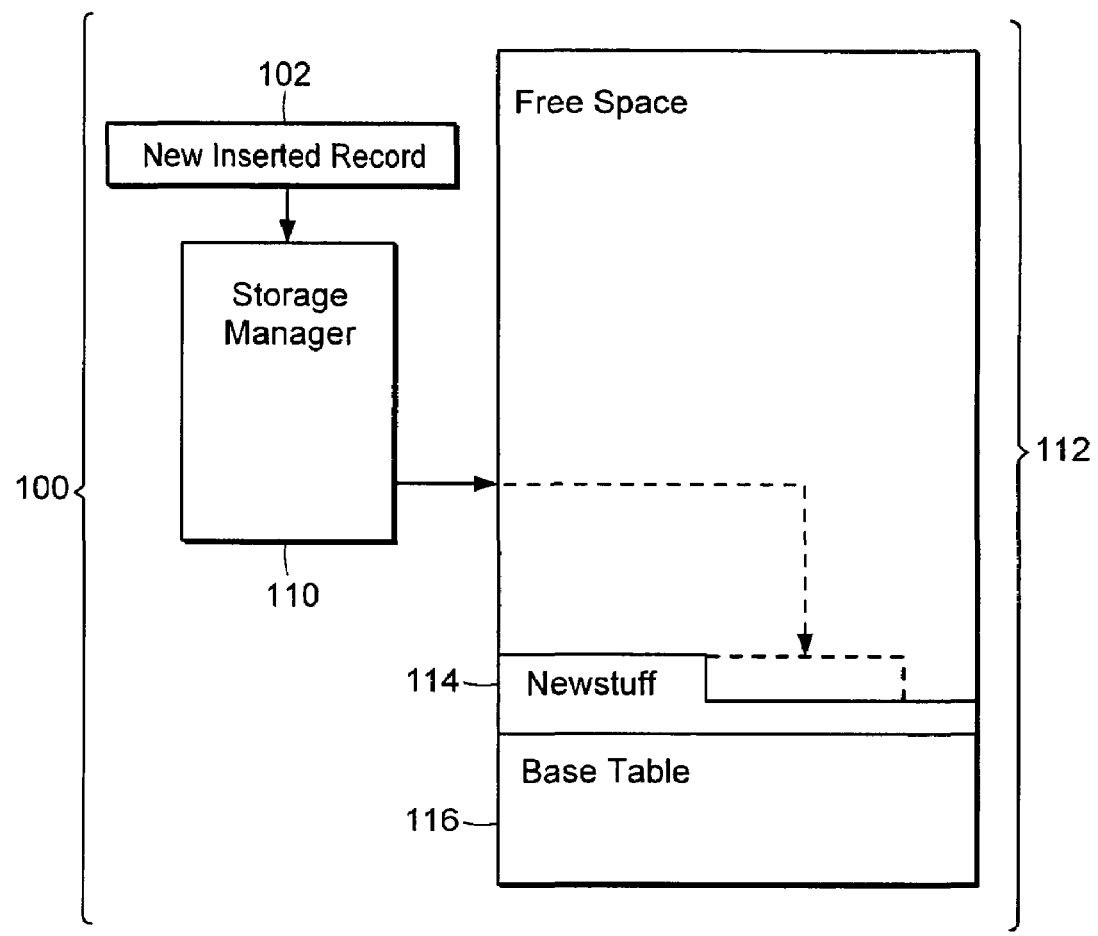
FIG. 1 is a high level diagram illustrating a Base Table and new records.

A description of preferred embodiments of the invention follows.

Discussed herein are solutions to three problems with the use of materialized views: storage mechanics, maintenance and performance.

One embodiment of the invention provides maximum performance for base table and materialized view actions by distributing data over a plurality of storage units. Each storage unit contains a storage device, for example, a hard disk, random access memory (RAM), and a central processor unit (CPU). Only a portion of each disk is usually used for storage of the base tables. The rest of the disk is allotted for the use of materialized views and other relations. Because each storage unit has its own CPU and disk controller, the storage unit can control and maintain its own data without host control; each unit is also independent of the other units. This independence may be an advantage over other systems, in which storage, even if it consists of multiple disks, is treated as one continuous unit and does not have a dedicated processor for each disk.

In one aspect of the invention, control over portions of a particular materialized view is distributed to one or more storage units, each storage unit storing portions of the materialized view that correspond to portions of the base table stored on that storage unit. The maintenance of the portions of the materialized view may then be performed by the respective storage unit independently of the host controller.

One embodiment of the invention breaks a materialized view down into three sections. The first section contains the base records of the materialized view; on creation or refresh, these are all the records transformed from the base relation and stored in the view. This section is referred to as "Oldstuff".

As new records are inserted into the materialized view, they may be stored in the second section, which is referred to as "Newstuff". These records may be stored on disk, but are not yet inserted into the "Oldstuff" section of the materialized view. The new records may be tagged as private or public. The stored new records may be transformed into a format appropriate for the materialized view before being stored on disk. Alternatively, the new data may be transformed into the appropriate format only when it is needed in response to a query.

The third and last section contains a list of deleted records. Deleted data may not be deleted immediately and, instead, an indication of deleted data may be stored on disk. The indication may be by record ID, transaction ID, or other criteria, such as, for example, by time of the transaction.

The new records may be merged with the records from the materialized view as they are streamed to the output in response to a query. Similarly, the deleted records may be removed from the data of the materialized view as it is streamed. The transformation, deletion, and/or merging may be performed in the storage unit hardware. During a time of low activity on the storage unit, the new records may physically be merged into the materialized view ("refreshed"), or the deletes can be propagated to the "Oldstuff", so that the records can be permanently deleted.

One embodiment of the invention leverages the storage unit distribution; a storage unit scans each of the three sections, combines them into one unit (sorting, aggregating, etc., as necessary), and streams them out as if they were stored as one. In this manner, the changes contained in the "Newstuff" and deleted records are propagated to the materialized view without requiring an expensive modification to the "Oldstuff" of that view. The returned records are complete, in proper order, and are transactionally correct.

The storage architecture of a storage unit 100 is illustrated in FIG. 1. As a new record 102 is presented for insertion into the base relation, storage manager 110 is responsible for storing the record on disk. The disk may be occupied, among other things, by a portion of the base relation 116 and a section 114 labeled as "Newstuff"—the portion dedicated to storing new records that have not been incorporated into the base relation yet. Inserting new records into the base relation immediately as they are received may be taxing on performance of the storage unit. Instead, the new records—Newstuff—are stored separately from the base relation and are incorporated into the base relation at the time of low activity on the storage unit, or when explicitly instructed to by the maintenance processes. Meanwhile, when the base relation is accessed, Newstuff is scanned as well to determine whether any new records need to be returned in response to a particular query.

Each storage unit 100 is responsible for a portion of the base table that has been distributed to it and the corresponding portion of any materialized views. Because each storage unit 100 "owns" its data, it can choose when to update the materialized views from the base table. If a storage unit has a period of low usage, it can schedule tasks such as view updating and statistics gathering. Unless a user or system request requires these actions, they are left to the discretion of the individual storage unit 100, which can act independently of the other elements of the system.

This is different from common prior art distributed systems, where the "individual processors" are actually system software processes. Such prior art systems may have one or more processors, but the number of processes is far greater than the number of processors. Thus, the processes must compete for execution time on the processors and maintenance of materialized views has a direct effect on the other processes, such as queries, running on the system. One embodiment of the invention has a dedicated processor on each storage unit, which is independent of the actions of the other storage units' processors.

One embodiment of the invention employs the distributed nature of the storage units, combined with their autonomous processing power, to yield additional performance. In common prior art systems, the storage, while potentially existing on many disks within a storage device, is still treated as one storage unit. In order to perform an update on a single base table of size bytes, the system must scan and process the table from byte 0 to byte S-1 in order. One embodiment of the invention accomplishes the same task in the time it takes to scan and process S/N bytes, where N is the number of storage units in the system.

There may be several additional techniques to yield better materialized view performance. These techniques include: two different mechanisms for updating materialized views, retention of Methods for creating a view, a special mechanism for storing new data inserted into a table/view, optional row headers, and delayed or "lazy" deletes. Each of these techniques is described in detail below.

Described herein is a framework on which many different types of materialized views can exist, including but not limited to Projected, Redistributed, Aggregated, and Auxiliary/Normalized materialized views. In one embodiment of the invention, the database appliance consists of a host and a plurality of storage units. Each storage unit consists of, among other elements, a central processing unit ("CPU") and a hard disk. Data in the system is distributed across the plurality of storage units and the distributed nature of the system is used to yield high performance and ease of maintenance for materialized views.

Generally, in materialized view architectures, raw data is stored on disk in table format. These tables are referred to as "base tables." These base tables provide all the columns and all the records of the table, but the user may want to view the data in various other ways. Views provide an alternate access to this data. For example, the base table might be Orders, storing customer orders for a particular store. A view ("VIEW_A") may be defined on this table that would provide the user only with particular columns, such as OrderNumber, OrderCustomer, OrderDate, and OrderCost, while filtering out other information stored in the base table.

When a user accesses VIEW_A, a query is executed in which the full base table Orders is scanned and only the columns needed by VIEW_A are returned. If the view is accessed often enough, this full scan of the base table becomes costly. Materializing the view by storing the view data reduces this scan time. If Orders contains tuples that are 100 bytes wide, and VIEW_A's tuples are 50 bytes wide, a scan on a materialized VIEW_A will take half the time of a scan on Orders. Furthermore, a sorted materialized VIEW_A will improve performance for queries in which a subset of records is needed, for example all records where OrderNumber is between "5001" and "6000". Acting as an index, this sorted materialized view may reduce scan time further than a regular materialized view.

However, as new records are added to the base table and existing records are modified or deleted, the materialized views must be updated or they will not accurately reflect the raw data. Materialized views in this state are called "stale". As the number of materialized views stored on the system increases, the issues of storage, updating, and maintenance become more critical.

One embodiment of the invention takes advantage of the plurality of storage units 100 by distributing the materialized view over one or more storage units 100. Each storage unit 100 has control of, or "owns" the data contained on it. Furthermore, many of the types of materialized views that can be created are considered local to that storage unit. That is, the materialized view data on a storage unit corresponds to the data of the relations on which it was built; this base data also exists on the same storage unit. Thus, many types of materialized views can be created on each storage unit without the need for interaction with other storage units or the host. Storage unit-level control of the data both in base tables and in views allows the system to support many materialized views.

Figure 2:
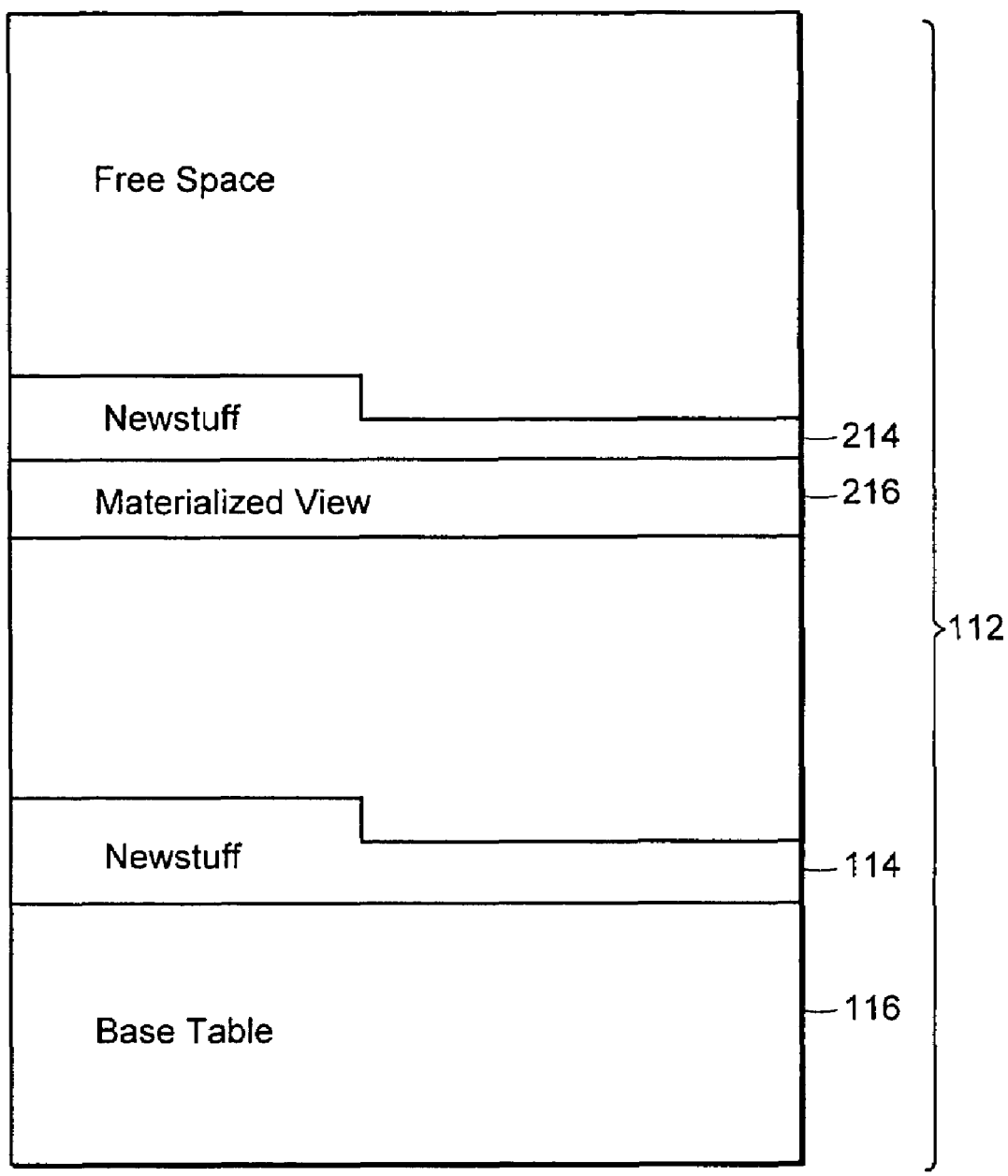
FIG. 2 illustrates the Base Table with a Materialized View.

Illustrated in FIG. 2 is the disk storage architecture of the storage unit 100, the disk 112 of which contains portions of the base table 116, Newstuff 114 and associated materialized view 216 and Newstuff 214 appropriate for the materialized view 216. As mentioned above, materialized records contained on a storage unit 100 usually correspond directly to base table records on that same storage unit. Because data does not have to leave the storage unit for updating materialized views from base table records, maintenance of materialized views is greatly simplified, and the network and backplane bottlenecks are avoided. Insertion and maintenance of new records into the materialized view is discussed below in connection with FIGS. 3–7.

The creation of materialized views can be initiated by either a human Database Administrator ("DBA") or a software DBA. The Structured Query Language ("SQL") is one possible syntax for the creation of a materialized view and it is similar to the syntax of creating a normal view. Below is an example of SQL syntax for creating the materialized view "mv_orders," which is a materialized version of VIEW_A described above:

```
CREATE MATERIALIZED VIEW mv_orders AS
    SELECT
        OrderNumber,
        OrderCustomer,
        OrderDate,
        OrderCost
    FROM
        Orders
    GROUP BY
        OrderNumber,
        OrderDate,
        OrderCustomer,
        OrderCost
    ORDER BY
        OrderNumber;
```

In this example, a view is created on the base table Orders, selecting just the four specified columns and ordering by the records by the first column, OrderNumber.

After this SQL query is issued by the DBA, it is parsed and an optimizer generates an execution plan. The execution plan is a set of instructions for maintaining the materialized view. The execution plan of a particular materialized view may be referred to as its "Method."

The execution plan is then sent out by a dispatcher to each of the storage units, where the plan is carried out. The query is run against the base table, the proper data is extracted, and then the storage units write the results back to disk and save them as a new table, a materialized view named mv_orders. Subsequent queries on mv_orders result in the scan of the portion of the disk containing mv_orders, not the base table Orders.

In this relationship, the base table is the "parent" and the materialized view is the "child". Views (materialized or not) can be created on top of other materialized views, creating additional levels of hierarchy. In each relationship, the child relation inherits some characteristics from the parent relation.

In order to create the child from the parent, the system may create a Method, which is a set of rules/procedures for creating that particular child from that particular parent. The Method contains the execution plan, as mentioned above, that the system has generated from the user's SQL query, and it also contains the instructions needed to reproduce the child from the parent. The instructions may be compiled (machine code) or uncompiled—to be interpreted at the individual storage units. A Method can be thought of as a blueprint for a materialized view.

For example, below is a Method for the mv_orders materialized view.

IDs:

> Parent Orders, TableID 3426
> Child mv_orders, TableID 6332
> MethodID 43

Plan:

> Project { OrderNumber, OrderCustomer, OrderDate, OrderCost } : { 1, 3, 6, 8 }
> Sort { OrderNumber } : { 1 }

Figure 3:
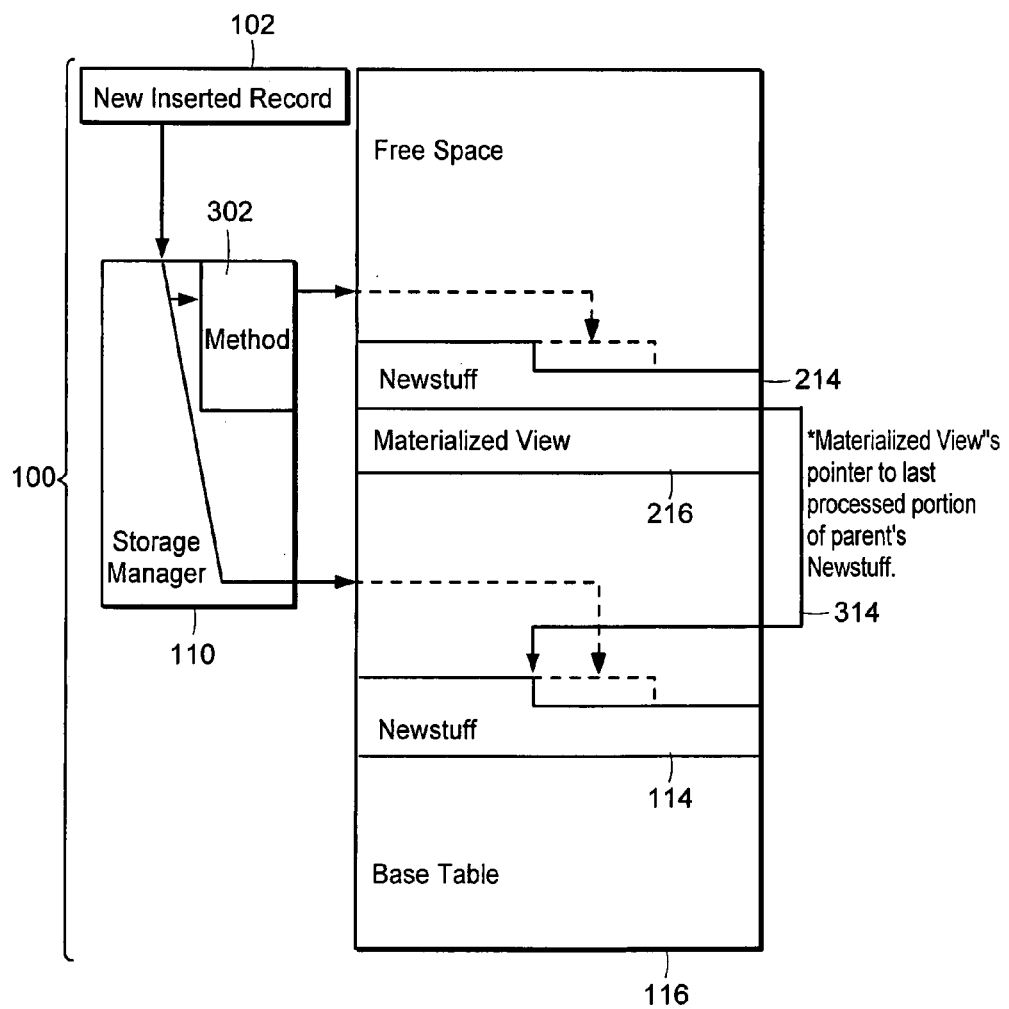
FIG. 3 illustrates the use of pointers in incorporating new records.

FIG. 3 illustrates the insertion of new records 102 into the materialized view Newstuff 214. Pointer 314 is used to point to the last processed portion of the materialized view's parent's Newstuff. As new records are inserted into Newstuff 114, they are sequentially processed and appropriate records—those that would be eventually inserted into materialized view 216—are stored in materialized view Newstuff 214. Method 302 may be used to determine which records should be stored in Newstuff 214. The insertion of Newstuff 214 into the actual materialized view 216 may occur during the time of low activity on the storage unit, or during regularly-scheduled or explicitly-invoked tasks.

This insertion is "lazy"—that is, it is not accomplished immediately and is instead delayed to the convenient time so as not to degrade response time of the storage unit to queries. Meanwhile, if a query comes in for materialized view 216, Newstuff 214 is also scanned to check whether it contains any records relevant to the query. If such records are found, they are merged with the materialized view records as data is being streamed to the output in response to the query. Thus, storage unit 100 returns a complete data set, a portion of the materialized view that appears as if stored in one piece, rather than in two separate sections.

Method 302 may be used to control transformation of the data as it is prepared for merging with the materialized view data in response to a query. For example, if the materialized view contains selected columns and records sorted in a particular manner, the records in Newstuff may contain only the selected columns, but not be sorted. The sort is performed then on the Newstuff before merging the records from Newstuff with data from the materialized view as it is streamed to the output.

The host may generate Methods at the time of a materialized view's creation. In the event that the view needs to be rebuilt at a later time, the creation Method can be re-used to recreate the view. Other types of Methods (for insert, update, and deletes, for example) can also be re-used if the definition of the materialized view does not change. Thus, the host stores these Methods for later use. The Methods may also be cached on the individual storage units 100, so that they do not need to be transmitted before use. In addition, Methods may be created automatically on the storage units 100 from simple table schemas. Below is the example of a simple schema that can be used in place of a Method:

> Table Layout:
>
> Table a {
>    a_key     integer     not null
>    a_name     character(20)     not null > -continued
>
> Table Layout:
>
>    a_address     character(40)
>    a_phone     character(15)
>    a_comment     character varying(90)     not null
> }

> Materialized View Schema:
>
> CREATE MATERIALIZED VIEW mv_a AS
>    SELECT
>       a_name,
>       a_phone
>    FROM
>       a
>    GROUP BY
>       a_name,
>       a_phone;

From a simple materialized view schema like the above, the storage unit can determine that it should project columns a_name and a_phone. A Method would, instead, tell the storage unit how to project the columns and process them. In this case, the storage unit will assume that just the two columns are needed, and does not need instructions on how to project them. In this way, the storage unit generates its own set of instructions from an implicit command handed down to it.

Methods are always stored on the host and the host may act as a library or repository of Methods, storing the best (valid) copies of Methods. A storage unit can request the newest copies of Methods from the host in the event that the storage unit does not have a particular Method cached or in the event that the version of the Method required does not match the version of the Method in cache. The decision of whether or not to cache the Method is performed on the storage unit at the time of Method receipt. Base on statistics, history, and caching storage capacity, the storage unit may decide whether or not the Method should be cached.

As mentioned above, the Methods have version numbers associated with them. Any change to the Method (via change to the materialized view definition, schema, or layout) increments the version number. An execution plan sent by the host to the storage units has a "Method version number" indication attached to it. If a storage unit has the specified Method version in cache, it uses the cached Method, otherwise, it can request the proper version from the host.

One example of a type of materialized view that can be created by the invention is a Sorted, Projected materialized view ("SPM"). The above example of a view created on the Orders table is an SPM view. In the example, four columns are projected (or selected) from the base table. The records in this narrow version of the Orders table are sorted according to the values in one of the columns of the table. Sorted, Projected materialized views are generated with host- and storage unit-resident code as well as generated code specific to the view's projected columns and those column's data types.

Figure 4:
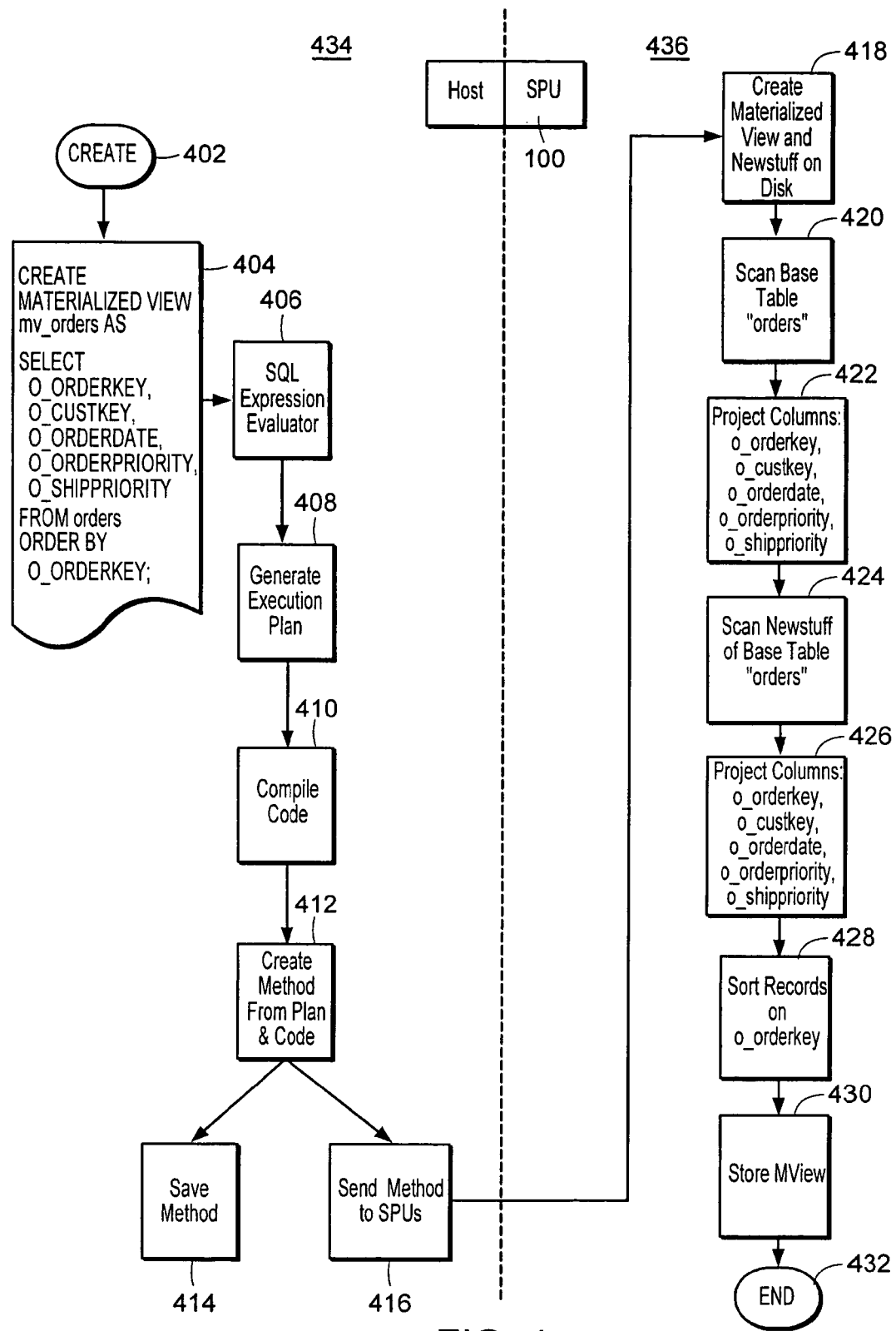
FIG. 4 is a flow diagram of materialized view creation.

Generation of the materialized view is illustrated in FIG. 4. The generation of a view has two basic phases (434 and 436). The first phase 434 is the definition of the view and associated table. The second phase 436 is the actual materialization of the view into the table associated with the view.

In the first phase 434, the view and its associated table are defined and created. The association and relationship between these two entities and the parent base table are kept in a variety of system tables on the host. The underlying table used in the materialization of the view is defined on the host as well as on the storage units.

In response to a command 402 to create the materialized view mv_orders and an indication of the materialized view schema 404, the SQL expression evaluator evaluates the command in step 406 and an execution plan is generated in step 408 as described above. The execution plan is compiled in step 410. In an alternative embodiment of the invention, the compilation of the execution plan may be skipped.

Using the execution plan and compiled code, a Method is created in step 412, after which it is saved in the host unit (step 414) and is also sent to the individual storage unit(s) responsible for this materialized view (step 416).

In the second phase 436, the view is materialized into the view's table. The view-specific projection from the base table (steps 418, 420, 422, 424 and 426), record sorting (step 428), and materialization of the view (step 430) are driven by a plan with generated code. The generated code is tailored to the number and data types of the projected columns. The plan, which is the driving force in materializing the view, is somewhat adaptive to the size of the view and the number and data types of the ORDER BY keys.

If the ORDER BY key is a single column that is either a four byte integer or a date, then a fast postman sort may be initially used in sorting the view's records. In some cases, the view data cannot be postman sorted due to memory constraints, skew, and quantity of data. If the storage units indicate to the host that this is the case or if the ORDER BY key does not fit the postman sort criteria, then a merge sort is used to sort the view's records.

The postman sort mentioned above adheres to the following algorithm. First, the base table is scanned and the ORDER BY keys are projected out and are applied to a histogram. The histogram is a flat array of one million entries. As keys and record sizes are passed through the histogram, the keys are used to index into the array and a total record byte count is kept per key index. Once all of the keys and corresponding record sizes have passed through the histogram, the histogram is divided into buckets of approximately sixteen megabytes aligned to a key index boundary and the high key for each bucket is retained. If any single key index in the histogram has a total record byte count of greater that sixteen megabytes, the postman sort is considered invalid.

If the histogram phase completes successfully, a subsequent second scan of the base table using the materialized view projection is performed and each record is placed in the appropriate bucket based on the record's key value. Once all records have been placed in a bucket, the contents of each bucket are sorted in ascending order. Buckets are processed in ascending order as well, starting with the NULL bucket, negative key values, and then positive key values. As each bucket is processed, it is written to the materialized view table.

When the materialized view has been written to disk in step 430, an index of the materialized view may be generated to optimize materialized view scan times.

Adding new records into a base table is accomplished in the following manner: A distribution algorithm has been previously applied to the original data in order to determine which storage unit it should be stored on. The same algorithm is applied to the new tuple(s) to be inserted. Once the destination storage unit(s) has been determined, the host sends out the tuples to the proper destination(s). Each storage unit stores its base table on disk; new records added to the base table are stored with and incorporated into the base table. Later queries against the base table access all records of the base table, including the new records.

However, when new records are inserted into the base table, the materialized views must reflect these new records as well, or else the views should be considered stale because they would not accurately represent the data contained in the base table. There are two different methods for handling the insertion of new data:

1. Own Newstu for "Private Newstuff". In one case, the materialized views are given their own set of new records, stored with the view but tagged as "Newstuff". On each storage unit containing the materialized view, a portion of the disk is assigned as Newstuff for that view (see FIG. 2). The storage unit is responsible for propagating rows inserted into the base table to the materialized view's Newstuff. In order to accomplish this in an efficient manner, the Method for creating the view is passed from the host to the storage units. A storage unit can optionally cache the last few Methods it has received from the host, but in the event that a Method is requested that the storage unit does not have cached, it must request the host to send the Method. The Method is then executed on the storage unit. For example, a new inserted record containing all fourteen columns of the base table would be stripped down and saved in the materialized view's Newstuff as just the four columns needed for that view.

In this manner, each insert to a base table or parent is propagated to the children. In order to make this process efficient, storage units can choose to delay the propagation until a number of inserts have occurred in the base table. So long as there are no requests made against the materialized view, the inserts can accumulate. The storage unit can execute the Method against the block of inserted data from the base table; the storage unit keeps a pointer for that materialized view into the base table to designate the accumulated inserts. This process can happen as a background task on the storage unit or can happen when the number of inserts reaches a certain size. Either way, when the materialized view is requested, the inserts are propagated, so the materialized view's Newstuff is current. This is "Pull" propagation, as opposed to "Push" propagation; these terms are discussed in more detail below.

As the number of materialized views (or children) increases, the effort needed to propagate inserts (and other changes) from the parents to the children increases. One embodiment of the invention reduces the cost of storing views by spreading the storage of views over the plurality of storage units, so each is responsible for its portion of the view. Each storage unit can choose, based on its current task list, when to schedule an update of its portion of the materialized views. The cost of maintaining views may also be reduced by allowing for the storage of Methods. The Methods can be stored on the host or cached on the storage units, and retrieved later in order to manipulate new data (from an insert, per se) into the particular materialized view's format. Storing these Methods means that the system does not have to recalculate the execution plan and recompile the code necessary to create the materialized view.

2. Shared Newstuff. One embodiment of the invention also provides means for limiting the number of updates performed. In this case, materialized views share Newstuff; that is, there is only a single copy of Newstuff on disk that one or more materialized views read from. If two or more views share similar columns, a single Newstuff with just those columns is stored. Thus, a single update is required for propagation of an insert to all children sharing the Newstuff. Children can also use the Newstuff of their parent. For example, materialized views can share Newstuff with the base table. In this case, Newstuff is more of an abstract concept, since the base table does not really have Newstuff—instead, Newstuff is relative to the materialized view in question. That is, each materialized view sharing Newstuff with a base table has a pointer into the table's records at a given point, such that all records after that point are considered new. If there are multiple children of the base table, each may have its own version of Newstuff, that is, a different pointer into the base table.

If the materialized view shares Newstuff with the base table, the appropriate Method for that view is applied to the base table records for each query against the materialized view. After the query, the base table's Method-processed records contained in Newstuff according to the view can be optionally saved as the materialized view's Newstuff.

The advantage of shared Newstuff is that the number of disk writes is reduced to one on the insertion of a new record. In this model, materialized views never go stale; rather, they pull records from the shared Newstuff on a query, perform the appropriate transformation, and stream the records out. This model of Newstuff is advantageous on systems that contain a large number of materialized views built off of the same base relation(s).

Whether the Newstuff is to be shared or private may be determined during the creation of the materialized view. In one embodiment of the invention, by default, Newstuff is shared. That is, new records are placed in the base relation's Newstuff area and each materialized built off that base relation has a pointer to the base relation's Newstuff records. Materialized views may then be optionally tagged as having Private Newstuff. A DBA may choose to tag a materialized view thusly if the conversion from base relation records to materialized view relations is complex, e.g. if it includes a conversion with mathematical computation, aggregation, or other time-consuming tasks.

Materialized views, while sharing Newstuff with the base table (or another materialized view), can have different restrictions on the data and specifications for the columns than the base table (or other view) has. For example, if a particular column in the base table is defined as a four-byte integer type, the materialized view can define its version of the same column as a two-byte integer type, if it knows that the values of that column never exceed the two-byte limit. While the materialized view reads from the same records as the base table, a conversion on that column takes place when the view reads the data. Insertion of Newstuff is further illustrated below in connection with FIG. 7.

Modification of records in the materialized view can occur in several ways, but in the preferred embodiment, it is accomplished via an Insert/Delete pair. The old version of the record is deleted and the new version of the record is inserted. The mechanics of deletion are discussed below.

The advantage of Newstuff, whether owned by the view or shared with the base table, is the reduction of effort required to incrementally update a materialized view. A scan of the view consists of a scan of the base part of the view, a scan of the view's Newstuff, and then a join of the two. Updated and inserted records can just be added to Newstuff, rather than having to be worked into a sorted table.

One embodiment of the invention employs two types of maintenance: "Push" and "Pull". Both types of maintenance are used in the system, but each child is assigned one type or the other. If a child is marked Push, the parent tells the child to update. The host announces an update to a subset of the storage units and transmits the update information to them.

If a child is marked Pull, it checks for an update from the parent. That is, the storage units poll the host for updates. In an alternative embodiment of the invention, a storage unit knows the mode of maintenance for all its tables, and therefore does not have to communicate with the host for updates. Children updated via Push maintenance are updated instantly, while children updated via Pull maintenance are updated as they are needed. A request for updating a child marked Pull can also be submitted by the user or take place as a system background task when the system is idle.

The described system supports many types of deletes. One type of delete employed by the invention to increase performance is called the "lazy delete". Lazy deletes do not actually take place in storage; the actual records they affect remain. However, the deletes are stored in the system, either in the host or on the storage unit level. Any records inserted are checked against the list of deletions before being added to Newstuff. The list of deletions can contain different types of deletions, including but not limited to deletions by transaction ID (TID) (see FIG. 7) or deletions by expression (see FIGS. 5 and 6).

Figure 5:
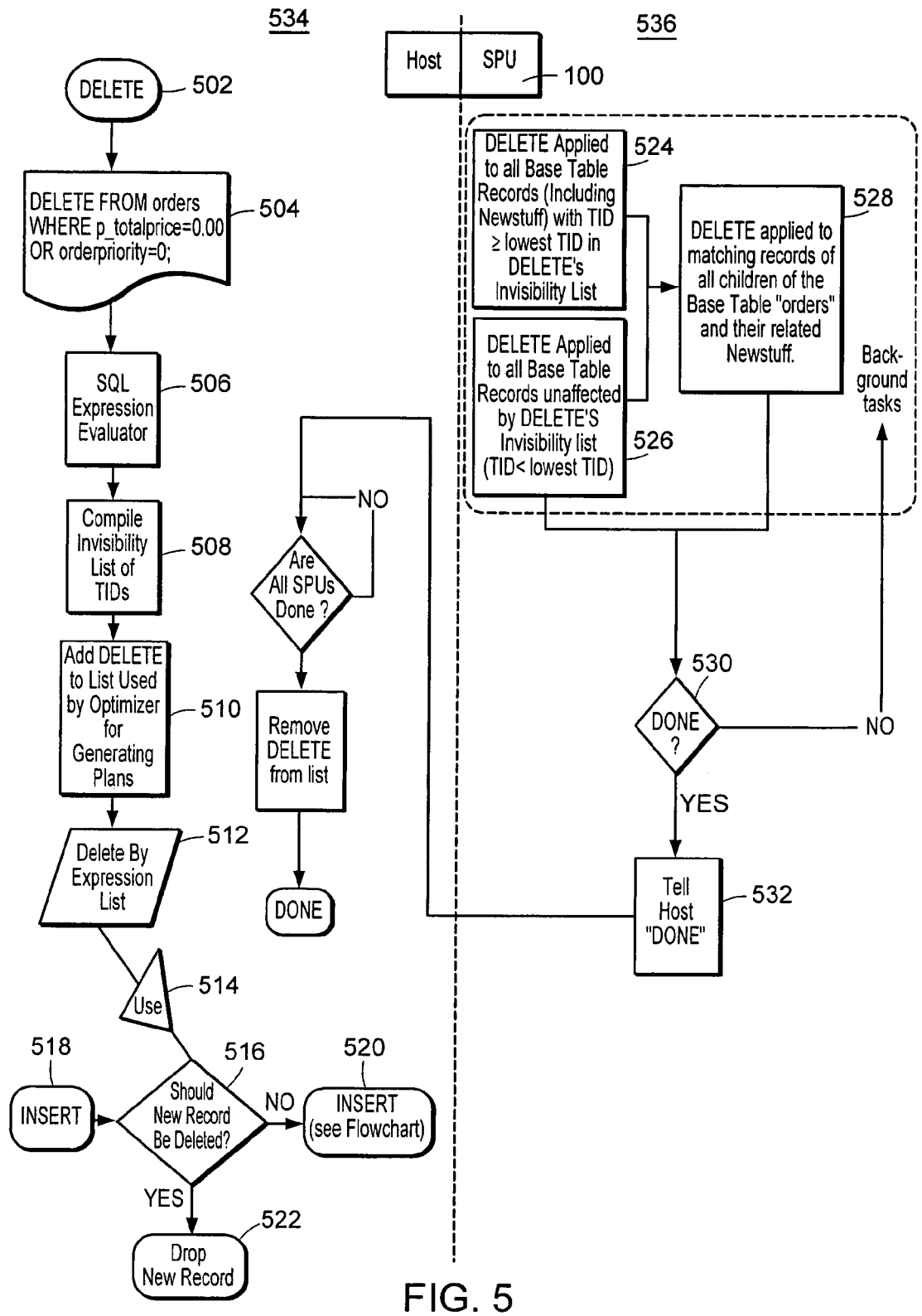
FIG. 5 is a flow diagram of deleting records by time indicators.

One example of deletion by expression is illustrated in FIG. 5. As with insertion, deletion takes place in two phases (534 and 536), performed on the host and on storage unit 100, respectively. In the first phase, phase 534, the expression is evaluated (steps 502, 504 and 506), after which a list of affected transaction IDs is compiled (step 508) and operation DELETE is added to a list used by the optimizer for generating plans (steps 510, 512 and 514).

In addition to deleting records from the materialized views, the system may need to delete records from Newstuff. Likewise, the records that are inserted into Newstuff (step 518) may already be applicable for deletion (step 516) based on particular expressions and, therefore, need not be inserted (step 522). Storage unit 100, in turn, applies DELETE to all base table records, materialized views and Newstuff (steps 524, 526, 528, 530, and 532).

Figure 6:
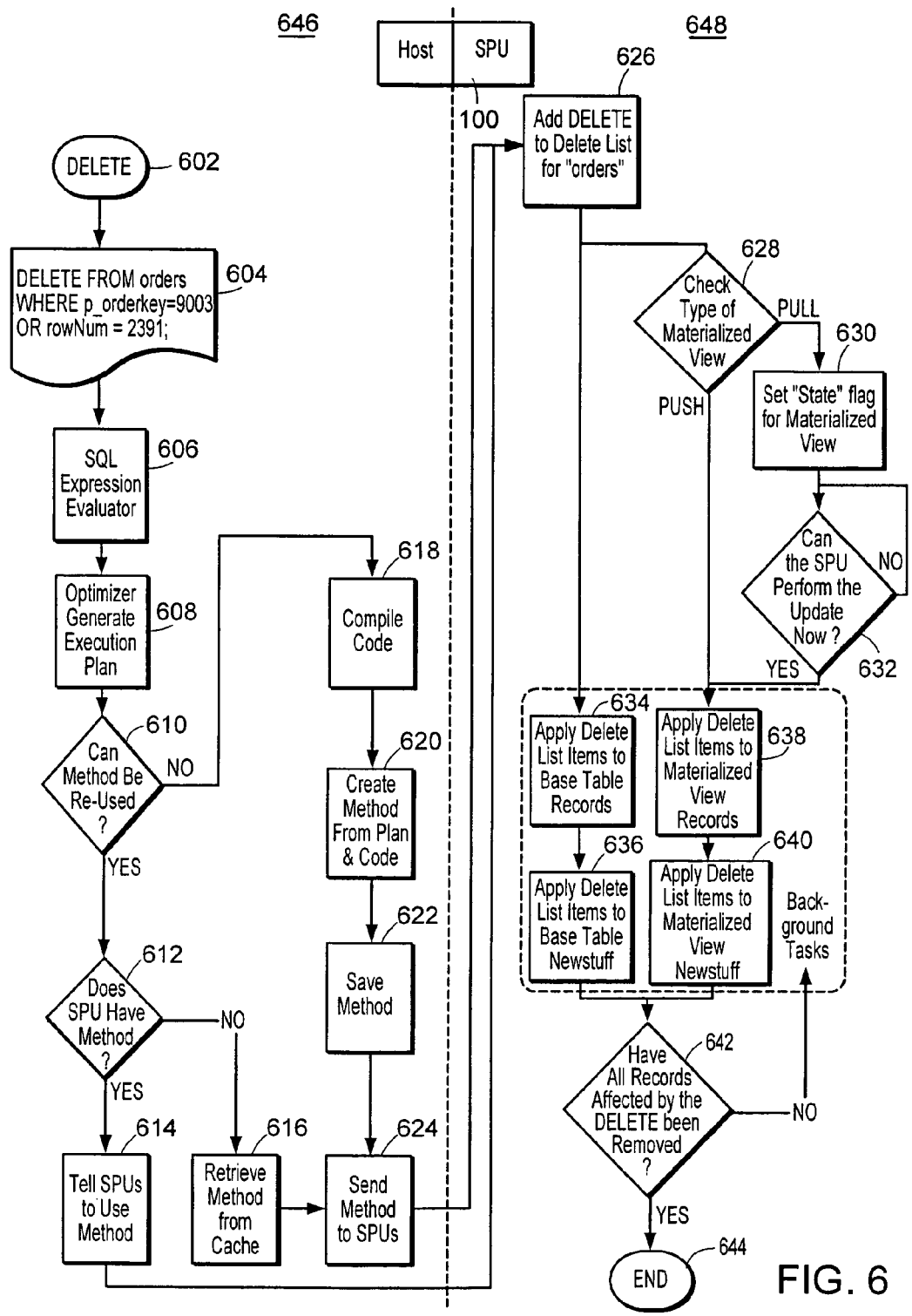
FIG. 6 is a flow diagram of deleting records by Primary Keys or row numbers.

FIG. 6 illustrates deleting records based on Primary Keys (unique keys that identify records) or row numbers. Similarly to deletion by expression, deletion takes place in two phases (646 and 648), performed on the host and on storage unit 100, respectively. In the first phase, phase 646, the key for deletion is evaluated (steps 602, 604 and 606) and an execution plan is generated in step 608. As described above, Methods can be compiled or interpreted and, in one embodiment of the invention, a decision whether to compile the Method is based on whether it can be reused, as illustrated in step 610. If the Method can be reused, the code for deletion is compiled (step 618) and the Method is created from the execution plan and the compiled code (steps 620 and 622). If the deletion code is not compiled, the host checks whether storage units have the Method already in step 612. If they do, it is not necessary to send the Method to the units and they are instructed to use the stored Method in step 614. If, however, storage units 100 currently do not have the Method, it is retrieved from cache (step 616) and sent to storage units 100 (step 624).

Storage unit 100 adds Delete Method to Delete List (step 626) and applies delete to the materialized views, base table records and Newstuff (steps 634, 638, 636, and 640). If the materialized view is of the PULL type (see below), the "Stale" flag is set for the next time the Materialized View checks for updates (steps 628, 630, and 632). The actual tasks of deletion are performed in the background, for example, at the time of low activity on storage unit 100.

Figure 7:
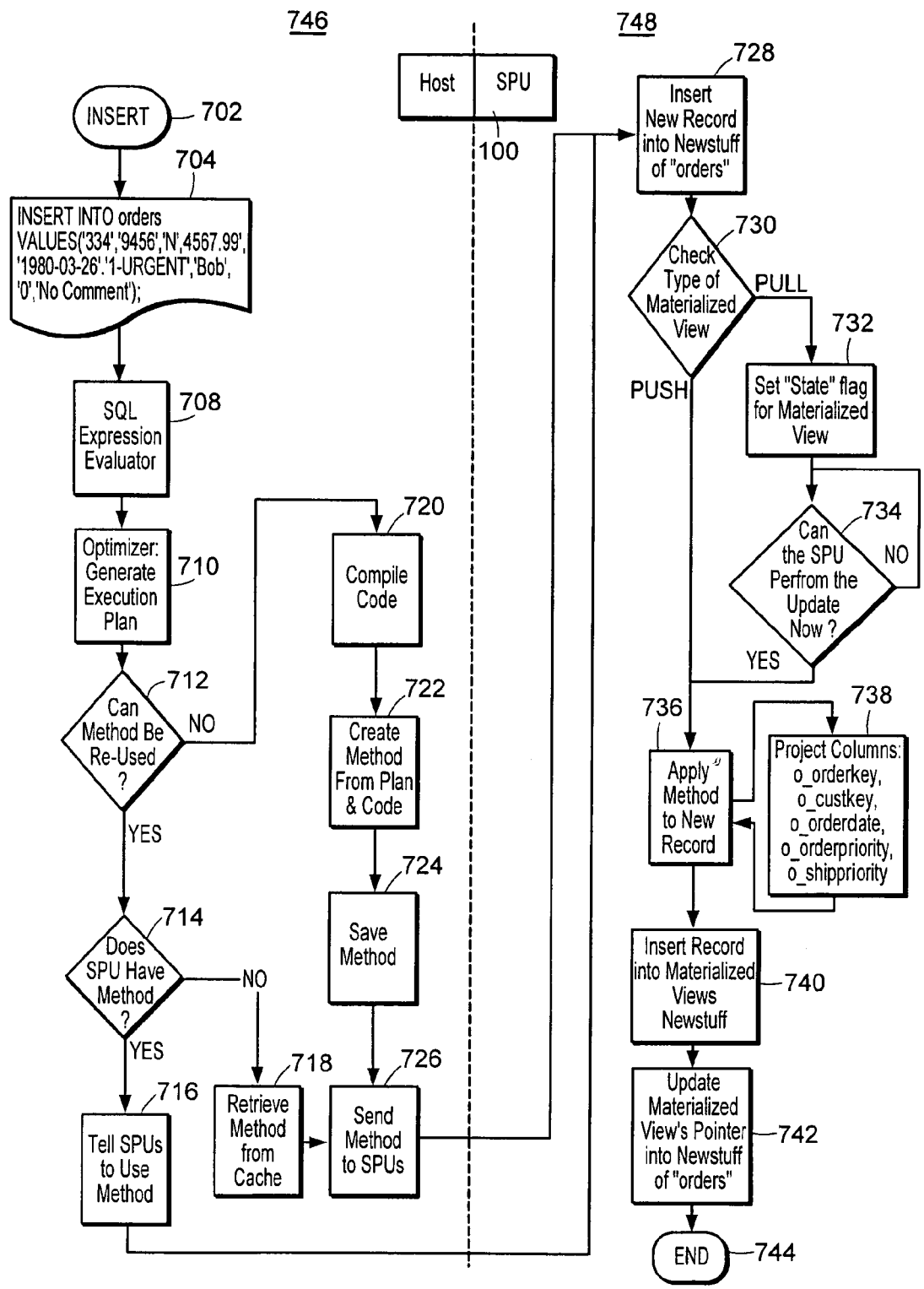
FIG. 7 is a flow diagram of new record insertion.

Insertion of new records is illustrated in FIG. 7. Insertion, like deletion, has two phases (746 and 748), performed on the host and storage unit 100, respectively. When instruction 704 to insert new record arrives, it is evaluated (step 708) and an execution plan is generated (step 710). Similarly to Methods for deletion, Methods for inserting new records can also be based on compiled code (steps 712, 720, 722, 724, and 726). Likewise, checks are made to determine whether individual storage units 100 already have the Method (steps 714 and 716) or whether it needs to be distributed to them (steps 718 and 726).

Storage unit 100 inserts the new record into Newstuff (step 728) and checks for the type of the applicable materialized views. For the "PULL" type materialized views, a "stale" flag is set (steps 732 and 734). If the materialized view is of the "PUSH" type or if the update can be performed immediately, the Method is applied to the new record (step 736) and the record is inserted into the materialized view's Newstuff (steps 740 and 742).

An example of deletion by TID is useful is when a transaction consisting of five single-record Insert operations has been entered into the system and has an assigned transaction ID #34620. A few hours later, this transaction is found to be incorrect, and the records are invalidated. A delete may then be performed against the TID instead of deleting each record individually. The delete may have the following syntax:

DELETE FROM table WHERE tid='43620';

The entry "43620" is then added to the Delete-by-TID list and records returned from subsequent queries are checked against this list. Any records that contain this particular TID are removed from the return set. The hardware capabilities of the storage units may be used to perform such operations efficiently as records are streamed off of the storage medium, filtering the matching records and not placing them in storage unit's memory.

If the lazy delete has not yet been propagated, all new queries add the restrictions from the list of deletions in order to remove those records affected by the deletes. In order to keep this list at a reasonable length, the system can propagate lazy deletes as a system task, a background task, or on the request of a DBA. In this propagation, the delete is first applied to the records of the base table. In a transactional system, the TID of the deletion is checked so that the propagation stops once records with TIDs unaffected by the deletion are reached. The delete is then propagated to each of the children of the base table. Once the propagation has been completed, the lazy delete is removed from the list and becomes permanent. The advantage to lazy deletes is the fact that the deletes are still effective even though they have not been propagated—they do not render the affected relations stale.

As mentioned above, materialized views may be "compressed"—that is, optimized to take the minimum space, thus also possibly reducing the time it takes to scan them. One possible method of compression is the algorithmic compression, where a record is compressed before it is written to disk and is uncompressed after it is read from disk.

An alternative method of compression is allowing for optional row headers to improve system performance for materialized views. Row headers include information about the record, including but not limited to TIDs and row numbers. Materialized views created without these headers are much faster to scan, because the records are narrower, but they are less flexible than tables with full row headers.

In particular, insert and delete operations that reference elements of the row headers are affected. One embodiment of the invention employs other elements of the record, such as primary keys or the remaining elements of the row header, to carry out these operations. For example, if a materialized view is created in which the row number is removed, a "delete by row number" is converted in the system to a "delete by primary key" operation, because both elements are distinct. This conversion takes place by analysis of the base table.

Yet another way of compressing the materialized views is to allocate a smaller type to a particular column than it has in the base table if all records in that column for a particular materialized view are capable of being stored in data types of smaller size. While space saving might be slight for an individual record, for materialized views and systems with millions and billions of records, the space saving can be tremendous overall.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer-implemented method of maintaining materialized views of a data source in a system of multiple storage units and a host controller, said method comprising the steps of:
   distributing to respective storage units control of portions of a materialized view,
      such that each storage unit controls and stores a portion of the materialized view corresponding to an associated portion of the data source;
   using the respective storage unit, independent of the host controller, maintaining the corresponding portion of the materialized view;
   executing a set of instructions associated with the materialized view;
   sending the set of instructions from the host controller to the storage unit,
      wherein the set of instructions comprises compiled instructions and not compiled instructions;
   caching the set of instructions at the storage unit; and
   at the storage unit, selecting a subset of instructions from the set of instructions for execution.

2. The computer-implemented method of maintaining materialized views of claim 1, wherein the set of instructions is based on a data schema.

3. The computer-implemented method of maintaining materialized views of claim 1, wherein the set of instructions is used to propagate rows inserted into the data source to the materialized view.

4. The computer-implemented method of maintaining materialized views of claim 1, further comprising:
   storing, in response to an instruction to insert new data into the data source, the new data on disk without inserting it into the materialized view.

5. The computer-implemented method of maintaining materialized views of claim 4, wherein the new data is shared among multiple materialized views and the multiple materialized views are maintained by one step of storing the new data on disk.

6. The computer-implemented method of maintaining materialized views of claim 4, further comprising:
   tagging the new data as private to the materialized view.

7. The computer-implemented method of maintaining materialized views of claim 6, further comprising:
transforming, before storing the new data, new data into a format appropriate for the materialized view.

8. The computer-implemented method of maintaining materialized views of claim 7, further comprising:
sorting the new data in response to an instruction to present the materialized view; and
merging the new data with data from the materialized view as it is streamed to output.

9. The computer-implemented method of maintaining materialized views of claim 4, further comprising:
transforming the new data into a format appropriate for the materialized view in response to an instruction to present the materialized view; and
merging the new data with data from the materialized view as it is streamed to output.

10. The computer-implemented method of maintaining materialized views of claim 9, wherein the step of transforming the new data is performed in storage unit hardware.

11. The computer-implemented method of maintaining materialized views of claim 9, further comprising:
sorting the new data according to a format of the materialized view.

12. The computer-implemented method of maintaining materialized views of claim 4, further comprising:
updating the materialized view during a time of low activity on the storage unit.

13. The computer-implemented method of maintaining materialized views of claim 1, wherein the data source is a base table.

14. The computer-implemented method of maintaining materialized views of claim 1, further comprising:
compressing the materialized view.

15. The computer-implemented method of maintaining materialized views of claim 14, wherein compressing the materialized view further comprises:
compressing a record before a write operation; and
decompressing a record after a read operation.

16. The computer-implemented method of maintaining materialized views of claim 14, wherein compressing the materialized view further comprises:
assigning a smaller data type to a column containing data of a larger data type, the data fitting within the smaller data type.

17. The computer-implemented method of maintaining materialized views of claim 14, wherein compressing the materialized view further comprises:
removing a Record ID column when there are no duplicates in data in the materialized view.

18. The computer-implemented method of maintaining materialized views of claim 14, wherein compressing the materialized view further comprises:
removing a Transaction ID column when there is no change in data records before an indicated time; and
recording the indicated time.

19. The computer-implemented method of maintaining materialized views of claim 1, further comprising:
indicating deleted data as deleted without removing it from the materialized view.

20. The computer-implemented method of maintaining materialized views of claim 19, wherein the deleted data is data before an indicated time, and the step of indicating the deleted data further comprises:
storing the indicated time; and
in response to an instruction to present the materialized view, removing records with a time indication less than the stored indicated time as data from the materialized view is streamed to output.

21. The computer-implemented method of maintaining materialized views of claim 19, further comprising:
deleting data from the materialized view corresponding to data source records indicated for deletion as data is streamed to output in response to an instruction to present the materialized view.

22. The computer-implemented method of maintaining materialized views of claim 19, further comprising:
physically deleting the indicated deleted data from the materialized view at a time of low activity on the storage unit.

23. The computer-implemented method of maintaining materialized views of claim 1, further comprising:
assigning a transaction ID to the materialized view.

24. The computer-implemented method of maintaining materialized views of claim 23, wherein the transaction ID of the materialized view represents a point past which transactions cannot be rolled back.

25. The computer-implemented method of maintaining materialized views of claim 1, further comprising:
creating the materialized view from the data source using one or more of base relationships.

26. The computer-implemented method of maintaining materialized views of claim 25, wherein the base relationships are further modified by modifiers.

27. The computer-implemented method of maintaining materialized views of claim 25, further comprising:
storing intermediate views if the materialized view involves more than one base relationship.

28. A computer-implemented system for maintaining materialized views of a data source, said system comprising:
a host controller;
multiple storage units communicating with the host controller;
one or more materialized views distributed to at least one storage unit, each storage unit controlling and storing, independent of the host controller, an associated portion of a materialized view corresponding to a portion of the data source;
a set of instructions associated with the materialized view, wherein the set of instructions comprises compiled instructions and not compiled instructions;
the set of instructions is stored at the host controller;
the set of instructions is stored at the storage unit; and
the storage unit selects a subset of instructions for execution.

29. The computer-implemented system for maintaining materialized views of the data source of claim 28, wherein the set of instructions is based on a data schema.

30. The computer-implemented system for maintaining materialized views of the data source of claim 28, wherein the set of instructions is used to propagate rows inserted into the data source to the materialized view.

31. The computer-implemented system for maintaining materialized views of the data source of claim 28, wherein new data in the data source is stored on disk without inserting it in the materialized view.

32. The computer-implemented system for maintaining materialized views of the data source of claim 28, wherein the new data is indicated as private to the materialized view.

33. The computer-implemented system for maintaining materialized views of the data source of claim 32, wherein the new data is transformed, before being stored on disk, into a format appropriate for the materialized view.

34. The computer-implemented system for maintaining materialized views of the data source of claim 33, wherein the new data is sorted in response to an instruction to present the materialized view and is merged with data from the materialized view as it is streamed to output.

35. The computer-implemented system for maintaining materialized views of the data source of claim 31, wherein the new data is transformed into a format appropriate for the materialized view in response to an instruction to present the materialized view and is merged with data from the materialized view as it is streamed to output.

36. The computer-implemented system for maintaining materialized views of the data source of claim 35, wherein the storage unit further comprises hardware adapted for transforming the new data into the format appropriate for the materialized view.

37. The computer-implemented system for maintaining materialized views of the data source of claim 35, wherein the new data is sorted according to a format of the materialized view.

38. The computer-implemented system for maintaining materialized views of the data source of claim 31, wherein the materialized view is updated during a time of low activity on the storage unit.

39. The computer-implemented system for maintaining materialized views of the data source of claim 28, wherein the data source is a base table.

40. The computer-implemented system for maintaining materialized views of the data source of claim 28, wherein the materialized view is compressed.

41. The computer-implemented system for maintaining materialized views of the data source of claim 40, wherein a record in the materialized view is compressed before a write operation and decompressed after a read operation.

42. The computer-implemented system for maintaining materialized views of the data source of claim 40, wherein compressed materialized view comprises a smaller data type assigned to a column containing data of a larger data type, the data fitting within the smaller data type.

43. The computer-implemented system for maintaining materialized views of the data source of claim 40, wherein data in the compressed materialized view contains unique keys other than Record ID fields and a Record ID column is eliminated.

44. The computer-implemented system for maintaining materialized views of the data source of claim 39, wherein the compressed materialized view further comprises indicated time, and wherein data in the compressed materialized view contains no change in data records before the indicated time and a Transaction ID column is eliminated.

45. The computer-implemented system for maintaining materialized views of the data source of claim 28, wherein deleted data is indicated as such without being removed from the materialized view.

46. The computer-implemented system for maintaining materialized views of the data source of claim 45, wherein the deleted data is data before an indicated time, and records with a time indication less than the stored indicated time are removed from data from the materialized view as it is streamed to output in response to an instruction to present the materialized view.

47. The computer-implemented system for maintaining materialized views of the data source of claim 45, wherein the deleted data is removed from data from the materialized view as it is streamed to output in response to an instruction to present the materialized view.

48. The computer-implemented system for maintaining materialized views of the data source of claim 45, wherein the indicated deleted data is physically deleted from the materialized view at a time of low activity on the storage unit.

49. The computer-implemented system for maintaining materialized views of the data source of claim 28, wherein the materialized view further comprises an assigned Transaction ID.

50. The computer-implemented system for maintaining materialized views of the data source of claim 49, wherein the Transaction ID of the materialized view represents a point past which transactions cannot be rolled back.

51. The computer-implemented system for maintaining materialized views of the data source of claim 28, wherein the materialized view is created from the data source using one or more base relationships.

52. The computer-implemented system for maintaining materialized views of the data source of claim 51, wherein the base relationships are further modified by modifiers.

53. The computer-implemented system for maintaining materialized views of the data source of claim 51, further comprising:
    stored intermediate views if the materialized view involves more than one base relationship.

* * * * *